United States Patent
Wang et al.

(10) Patent No.: US 7,990,915 B2
(45) Date of Patent: Aug. 2, 2011

(54) METHOD OF BALANCING WIRELESS LOAD AND ACCESS CONTROLLER

(75) Inventors: Hao Wang, Beijing (CN); Archana Suresh, Beijing (CN)

(73) Assignee: Hangzhou H3C Technologies Co., Ltd., Hangzhou (CN)

( * ) Notice: Subject to any disclaimer, the term of this patent is extended or adjusted under 35 U.S.C. 154(b) by 304 days.

(21) Appl. No.: 12/345,885

(22) Filed: Dec. 30, 2008

(65) Prior Publication Data
US 2009/0290489 A1 Nov. 26, 2009

(30) Foreign Application Priority Data
May 21, 2008 (CN) .......................... 2008 1 0112188

(51) Int. Cl.
H04W 4/00 (2009.01)
(52) U.S. Cl. ....................................... 370/328; 370/237
(58) Field of Classification Search .................. 370/351, 370/401; 455/436, 453
See application file for complete search history.

(56) References Cited

U.S. PATENT DOCUMENTS

| | | | |
|---|---|---|---|
| 7,688,779 B2 * | 3/2010 | Cromer et al. | 370/328 |
| 7,760,627 B2 * | 7/2010 | Kimball et al. | 370/230 |
| 7,808,960 B1 * | 10/2010 | Chan et al. | 370/338 |
| 2001/0024953 A1 * | 9/2001 | Balogh | 455/432 |
| 2005/0141522 A1 * | 6/2005 | Kadar et al. | 370/396 |
| 2006/0182023 A1 * | 8/2006 | Bejerano et al. | 370/229 |
| 2006/0262763 A1 * | 11/2006 | Peleg et al. | 370/338 |
| 2007/0258414 A1 * | 11/2007 | Cheng et al. | 370/338 |
| 2008/0075033 A1 * | 3/2008 | Shattil | 370/328 |
| 2008/0137622 A1 * | 6/2008 | Russell | 370/338 |
| 2009/0046632 A1 * | 2/2009 | Nanda et al. | 370/328 |

* cited by examiner

Primary Examiner — Ricky Ngo
Assistant Examiner — Ben Liu
(74) Attorney, Agent, or Firm — Marshall, Gerstein & Borun LLP

(57) ABSTRACT

The present invention discloses a method of balancing wireless load and an Access Controller (AC). The method includes: receiving by an Access Controller (AC) an association request of joining an Access Port (AP) sent by a Station (STA); calculating wireless load of the AP that the STA requests to join; determining whether one or more preset conditions are met, if the one or more present conditions are met, accepting the association request sent by the STA; otherwise, rejecting the association request sent by the STA. In the present invention, when an AP's wireless load is too large, STAs can be distributed to other APs, thereby optimizing load balance in the Wireless Local Area Network (WLAN).

17 Claims, 8 Drawing Sheets

METHOD OF BALANCING WIRELESS LOAD AND ACCESS CONTROLLER

FIELD OF THE INVENTION

The present invention relates to load balance technology, and more particularly to a method of balancing wireless load and access controller.

BACKGROUND OF THE INVENTION

Wireless Local Area Network (WLAN) technology is based on 802.11 Media Access Control (MAC) standards, which refer to a series of specifications developed by the Institute for Electrical and Electronic Engineers (IEEE). The MAC standards specify an over-the-air interface between a Station (STA) and an Access Port (AP).

FIG. 1 is a schematic illustrating a typical centralized WLAN network. As shown in FIG. 1, in the WLAN network, data are carried over wireless links between a STA and an AP, and are transmitted from the AP to an Access Controller (AC) through a wired network, the AC in turn forwards the data to an access network or to a destination AP and thereon to a destination STA.

FIG. 2 shows the procedure of controlling message interaction between an AP and an AC when an STA joins a wireless network. Specifically, the procedure is as follows.

Step 201: The STA gets on line, and broadcasts a Probe Request.

Step 202: The AP receives the Prove Request, and returns a Unicast Probe Response to the STA.

Step 203: The STA performs authentication to the AC via the AP.

The AP in step 203 is the one with the strongest Received Signal Strength Indication (RSSI) among a plurality of APs returning Unicast Probe Responses to the STA.

Step 204: If the authentication is successful, the STA sends an Association Request to the AC.

Step 205: The AC receives the Association Request and returns an Association Response to the STA.

Step 206: The AC starts providing service for the STA.

With dense deployments of APs becoming a tendency of market application, there may be multiple APs covering an area at the same time, so as to support features like fast roaming, location detection and RF (radio frequency) hole coverage. Coverage redundancy makes for a backup and also enhances network capacity.

Usually, the STA tends to join the WLAN network through an AP that is heard at highest RSSI. In other words, in an area that can be observed by the STA, even if there is more than one AP providing required wireless service, the STA tends to continue attempting to join the AP reflecting the highest RSSI. Hence there is a need for an important wireless feature: uniform distribution of STAs across APs in order to balance wireless loads.

At present, in order to balance wireless loads, most vendors control and limit number of STAs handled by each of the APs, which brings disadvantages as follows:

1. Only wired side traffic of an AP is taken into consideration at present, while wireless traffic flow of the AP is left out of account. Thus, load balance effect will be affected since wireless traffic flow is better at reflecting the AP's real traffic flow.

2. Each STA could contribute distinctly to the access network load. For instance, some STAs could be using the WLAN service for voice and some for video applications. So, using the number of STAs being serviced by each of the APs to balance the system load will not yield in an effective control.

3. Currently, an STA joins the wireless network through an AP with the highest RSSI at all time, and this innate feature of STA obstructs load balance.

SUMMARY

Embodiments of the present invention provide a method of balancing wireless load and an Access Controller (AC), so as to optimize load balance effect in the Wireless Local Area Network (WLAN).

Technical schemes of the present invention are implemented as follows.

A method of balancing wireless load includes:

receiving by an Access Controller (AC) an association request of joining an Access Port (AP) sent by a Station (STA);

calculating wireless load of the AP that the STA requests to join;

determining whether one or more preset conditions are met, if the one or more present conditions are met, accepting the association request sent by the STA; otherwise, rejecting the association request sent by the STA.

An Access Controller (AC) includes:

an association request processing module, capable of receiving an association request of joining an Access Port (AP) sent by an STA, sending out information of the AP that the STA requests to join, receiving wireless load of the AP that the STA requests to join, and if the wireless load meets the preset acceptance condition, accepting the STA's association request; otherwise, rejecting the STA's association request;

an AP wireless load calculating module, capable of receiving the information of the AP sent by the association request processing module, calculating wireless load of the AP, and sending the wireless load of the AP to the association request processing module.

Compared with existing technologies, in the method of the present invention, when an AC receives a request of joining an AP sent by an STA, the AC calculates wireless load of the AP the STA requests to join, if the wireless load meets a preset access condition, the AC accepts the STA's request; otherwise, the AC rejects the STA's request, so that the STA can be distributed to other APs when the requested AP is of heavy wireless load. Hence, load balance effect in the WLAN is optimized.

In addition, in an embodiment of the present invention, the AP detects STA information periodically and reports the detected STA information to the AC. The request sent by the STA will not be accepted by the AP until wireless load of the AP the STA requests to join is less than a preset maximum load, and/or differences between wireless load of the requested AP and wireless load of each of the other APs are all less than a preset value. In this way, STAs can be allocated to each AP equably, and load balance effect is further optimized.

Furthermore, the AC calculates wireless load of the AP according to traffic flow through each Radio and number of STAs current connected to each Radio. Therefore, not only number of STAs connected to the AP but also type of the service handled by the AP is taken into consideration. Hence, reliability of the obtained AP wireless load is enhanced, and load balance effect is further optimized.

Moreover, in an embodiment of the present invention, while an STA is rejected from joining an AP, this AP is notified not to respond probe requests sent by the STA, so that the STA will not keep on requesting to join this AP, and the STA is prevented from service rejection attack, either.

EMBODIMENTS OF THE INVENTION

The present invention will be further described in detail hereinafter with reference to the drawings and specific embodiments.

Figure 1:
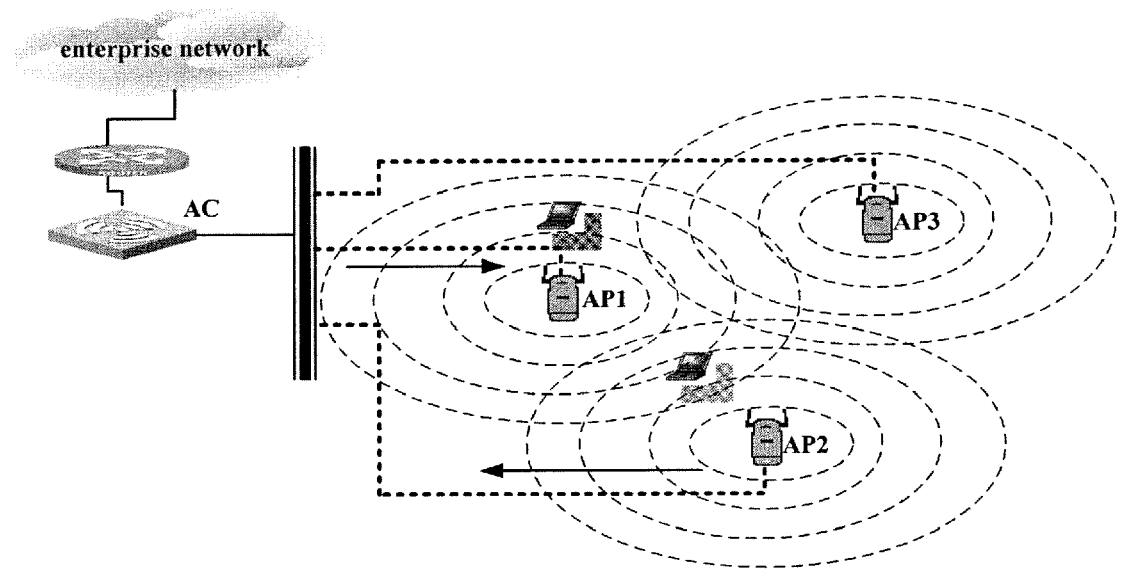
FIG. 1 is a schematic illustrating existing centralized Wireless Local Area Network (WLAN)
Figure 2:
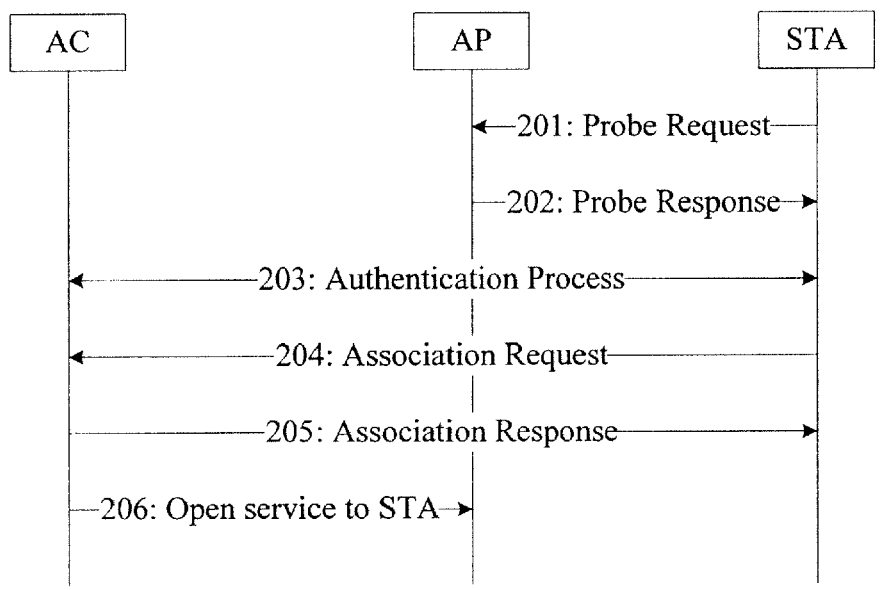
FIG. 2 is a schematic illustrating an existing procedure of control message interaction between an AP and an AC when an STA joins the wireless network.
Figure 3:
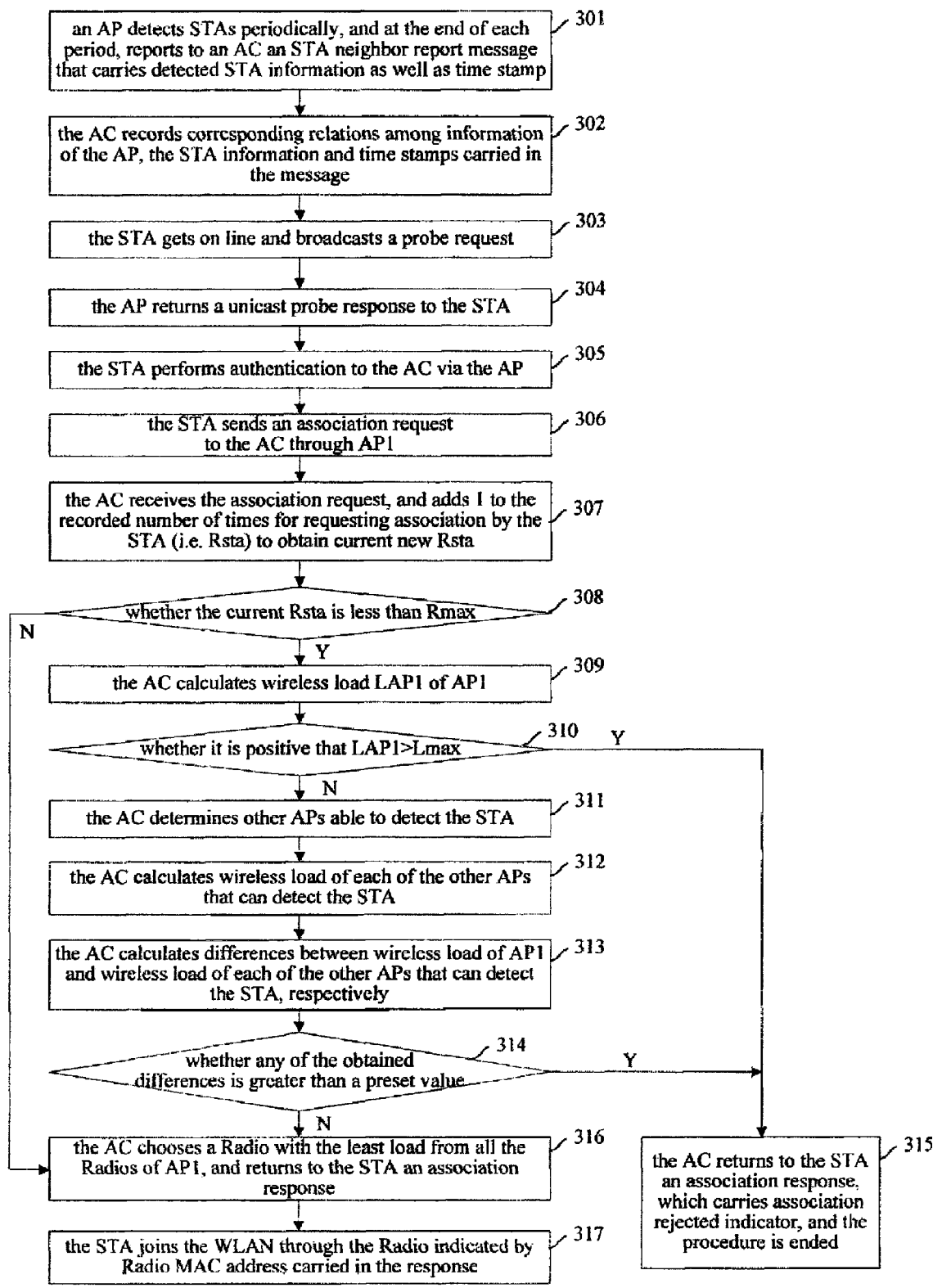
FIG. 3 is a flowchart illustrating a load balance procedure in the WLAN provided by an embodiment of the present invention.

FIG. 3 is a flowchart illustrating a load balance procedure in the WLAN provided by an embodiment of the present invention. As shown in FIG. 3, specific steps in the procedure are as follows:

Step 301: an AP detects STAs periodically, and at the end of each period, reports to an AC an STA neighbor report Type Length Value (TLV) that carries detected STA information as well as time stamp.

As long as the AP receives a message from an STA, it is assumed that the AP detected the STA. The STA information and time stamp detected are those carried in the message. The signal coverage of APs is always greater than STAs. Hence, when an AP receives a message from an STA, it is assumed that the STA can also receive messages from the corresponding AP.

When an AP receives a message from an STA, the AP will record the STA information and time stamp carried in the message with or without the message being destined to this AP.

For the sake of supporting the AP to report the STA information and time stamp to the AC, it is required to extend an existing protocol named Control and Provisioning for Wireless Access Points (CAPWAP) for the AP by using a TLV dedicated for vendors, which is shown in Table 1.

TABLE 1

Extended STA Neighbor Report TLV

| STA Neighborhood Report TLV |
| --- |
| 0 1 2 3 |
| 0 1 2 3 4 5 6 7 0 1 2 3 4 5 6 7 0 1 2 3 4 5 6 7 0 1 2 3 4 5 6 7 |
| Vendor ID |
| Element ID \| Radio MAC Addr |
| Radio MAC Addr |
| Number of STA Entries \| STA MAC Addr [0] |
| STA MAC Addr [0] |
| STA MAC Addr [1] |
| STA MAC Addr [1] \| . . . . . . |
| . . . . . . \| STA MAC Addr[n] |
| STA MAC Addr [n] |

Here, Vender ID is the identity of the vendor and takes 4 bytes; Element ID is the identity of the TLV and takes 2 bytes; Radio MAC Addr, which takes 6 bytes, is the MAC address of a Radio of the AP, wherein an STA has been detected through the Radio during current detection period; Number of STA Entries, which takes 2 bytes, is the total number of STAs detected through the Radio of the AP identified by the Radio MAC Addr during current detection period; STA MAC Addr [0], STA MAC Addr[1] . . . STA MAC Addr[n] are list of MAC addresses of the STAs detected by the AP during current detection period through the Radio identified by the Radio MAC Addr, and each of the MAC addresses of the STAs takes 6 bytes.

If the AP has more than one Radio, during each detection period, the AP needs to report STA information detected by each Radio to the AC through a STA neighbor report TLV, respectively.

Step 302: the AC receives the one or more STA neighbor report TLVs sent by the AP, records corresponding relations among information of the AP, the STA information and time stamps carried in the received one or more TLVs.

Some STA information among the STA information reported by the AP during current detection period may have been reported during previous detection period. Therefore, the following procedure may be performed in order to save storage space of the AC.

After receiving an STA neighbor report TLV, the AC compares the STA information carried in the received STA neighbor TLV and information of the AP that has sent the STA neighbor report TLV with the STA information and information of the AP recorded in corresponding relations among information of AP, STA information and time stamp. If they are matched, the AC compares the time stamp carried in the TLV with that in the corresponding relations, if the time stamp carried in the TLV is later than that in the corresponding relations, replace the time stamp in the corresponding relations by that carried in the TLV; and if the time stamp carried in the TLV is earlier than that in the corresponding relations, the STA information carried in the TLV is considered to be outdated and is then ignored.

In addition, in order to further save storage space of the AC, an ageing time can be set in the AC in advance. Then, if a corresponding relation is detected to be aged according to the time stamp in the recorded corresponding relations among information of AP, STA information and time stamp, this corresponding relation will be deleted.

Step 303: the STA gets on line and broadcasts a probe request.

Step 304: the AP receives the probe request sent from the STA, and returns a unicast probe response to the STA.

Step 305: the STA receives the probe response and performs authentication to the AC via the AP.

Step 306: if the authentication is successful, the STA sends an association request to the AC through an AP, such as through AP1.

Here, AP1 is the AP to which the STA has requested in the association request to join. When initiating an association request for the first time, the STA usually chooses an AP with the strongest RSSI.

Step 307: the AC receives the association request through AP1, and adds 1 to the recorded number of times for requesting association by the STA (i.e. Rsta) to obtain current new Rsta.

Step 308: the AC determines whether the current Rsta is less than Rmax, and if yes, execute step 309; otherwise, execute step 316.

Here, Rmax is a preset maximum number of times for requesting association, i.e., Rmax is a maximum retry limit, and Rsta≧Rmax means that the number of times for requesting association by the STA to join the WLAN has reached the maximum. In order to prevent the STA from DOS attacking, the AC must accept the association request currently initiated by the STA.

Step 309: the AC calculates wireless load of AP1 (i.e., LAP1).

LAP1 is dependent on both unit traffic flow of each Radio and number of STAs currently associated to each Radio. Here, unit traffic flow refers to traffic flow transmitted and received on a radio within each preset period of time, and the preset period of time is considered as a unit time.

Step 310: the AC determines whether it is positive that LAP1>Lmax, if yes, execute step 315; and otherwise, execute step 311.

Here, Lmax is a preset maximum load of the AP.

Step 311: according to the recorded corresponding relations among information of AP, STA information and time stamp, the AC determines other APs that are able to detect the STA. Here, other APs that can detect the STA may be APs in the vicinity of the AP that the STA requests to join.

Step 312: the AC calculates wireless load of each of the other APs that can detect the STA.

Step 313: the AC calculates differences between wireless load of AP1 and wireless load of each of the other APs that can detect the STA, respectively.

Step 314: the AC determines whether any of the obtained differences is greater than a preset value, if yes, execute step 315; and otherwise, execute step 316.

Step 315: the AC determines to reject the STA's association request and returns to the STA an association response, which carries association rejected indicator, and the procedure is ended.

The association rejected indicator can be provided by setting reason code in the association response as 17.

Step 316: the AC determines to accept the STA's association request, resets the recorded Rsta of the STA, chooses a Radio with the least load from all the Radios of AP1 to associate with the STA, and returns to the STA an association response, which carries association accepted indicator, meanwhile, Radio MAC carried in the response is filled with the MAC address of the Radio with the lowest load.

Step 317: the STA receives the association response and joins the WLAN through the Radio indicated by Radio MAC address carried in the response.

In another embodiment of the present invention, steps 309-310 may be omitted. That is, after deciding that the current Rsta is less than Rmax in step 308, skip steps 309-310 and directly execute step 311.

It should be noted that wireless load of the AP the STA requests to join is less than a preset maximum load may be considered as a first condition, and differences between wireless load of the requested AP and wireless load of each of the other APs are all less than a preset value is considered as a second condition. The two conditions can be used separately or in combination for deciding whether the request sent by the STA will be accepted or not.

Figure 4:
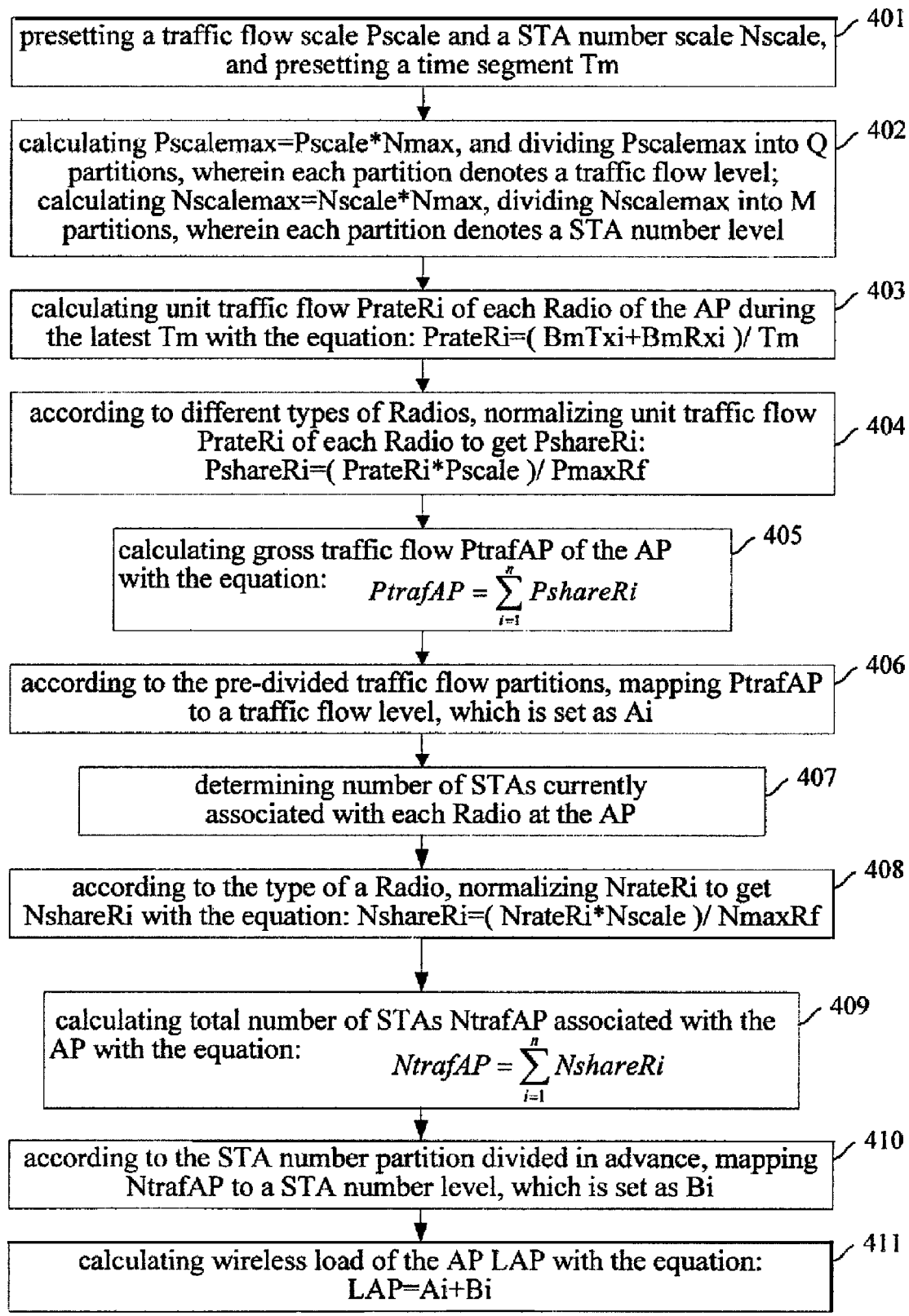
FIG. 4 is a flowchart illustrating a procedure of calculating wireless load of the AP provided by an embodiment of the present invention.

Wireless load of an AP is determined by loads of all the Radios at this AP, while load of each Radio is determined by unit traffic flow of the Radio and number of STAs associated with the Radio. FIG. 4 is a flowchart illustrating the procedure of calculating wireless load of an AP. As shown in FIG. 4, specific steps of the procedure are as follows.

Step 401: presetting a traffic flow scale Pscale and a STA number scale Nscale, and presetting a time segment Tm.

Step 402: calculating the AP's maximum unit traffic flow Pscalemax with the equation: Pscalemax=Pscale*Nmax, and dividing Pscalemax into partitions set Q, wherein each partition maps to a traffic flow level; calculating maximum number of STAs Nscalemax that can be joined to the AP at the same time with the equation: Nscalemax=Nscale*Nmax, dividing Nscalemax into partitions set M, wherein each partition denotes a STA number level.

Here, Nmax is the maximum number of Radios that an AP can possess.

Taking Pscalemax=100 for instance, Pscalemax can be divided into 8 partitions: [0, 5], [6, 20], [21, 35], [36, 45], [46, 55], [56, 65], [66, 80], [81, 100], and each partition corresponds to each of levels 1 to 8, respectively.

Step 403: calculating unit traffic flow PrateRi of each Radio of the AP during the latest Tm with the equation: PrateRi=(BmTxi+BmRxi)/Tm.

Here, Ri is the ith Radio, BmTxi is the traffic flow transmitted through Ri during the latest Tm, and BmRxi is the traffic flow received by Ri during the latest Tm.

Step 404: according to different types of Radios, normalizing unit traffic flow PrateRi of each Radio to get PshareRi.

$$PshareRi=(PrateRi*Pscale)/PmaxRf$$

Here, f is the type of a Radio, PmaxRf is the maximum rate supported by the Radio with type f. Radio's can support variant maximum rates, based on the radio type namely a, b, g. The radio rate needs to be normalized on to a common scale in order to support just comparison among various types of Radios. Since PrateRi/PmaxRf is a value less than 1, if PrateRi/PmaxRf is taken as unit traffic flow of a Radio, it is inconvenient to compare unit traffic flow of different Radios. Therefore, Pscale is set up to transform PrateRi/PmaxRf from fraction into integer. An example Pscale value is 100.

Step 405: calculating gross traffic flow PtrafAP of the AP with the equation:

$$PtrafAP = \sum_{i=1}^{n} PshareRi,$$

wherein n is the total number of Radios at the AP.

Step 406: according to the pre-divided traffic flow partitions, mapping PtrafAP to a traffic flow level, which is set as Ai.

Step 407: determining number of STAs currently associated with each Radio at the AP.

Step 408: according to the type of a Radio, normalizing NrateRi to get NshareRi with the equation: NshareRi=(NrateRi*Nscale)/NmaxRf.

Here, f is the type of a Radio valuing either a or b or g, NmaxRf is the maximum number of STAs that can be connected to a Radio with type f at the same time. As to different types of Radios, the maximum number of STAs being connected at the same time can be different. Therefore, the number of STAs currently connected to a Radio needs to be normalized according to the type of the Radio, in order to facilitate the comparison of STA numbers among different types of Radios.

Step 409: calculating total number of STAs NtrafAP currently associated with the AP with the equation:

$$NtrafAP = \sum_{i=1}^{n} NshareRi,$$

wherein n is the total number of Radios at the AP.

Step 410: according to the STA count partitions set divided in advance, mapping NtrafAP to a STA count level, which is set as Bi.

Step 411: calculating overall wireless load of the AP LAP with the equation: LAP=Ai+Bi.

Figure 5:
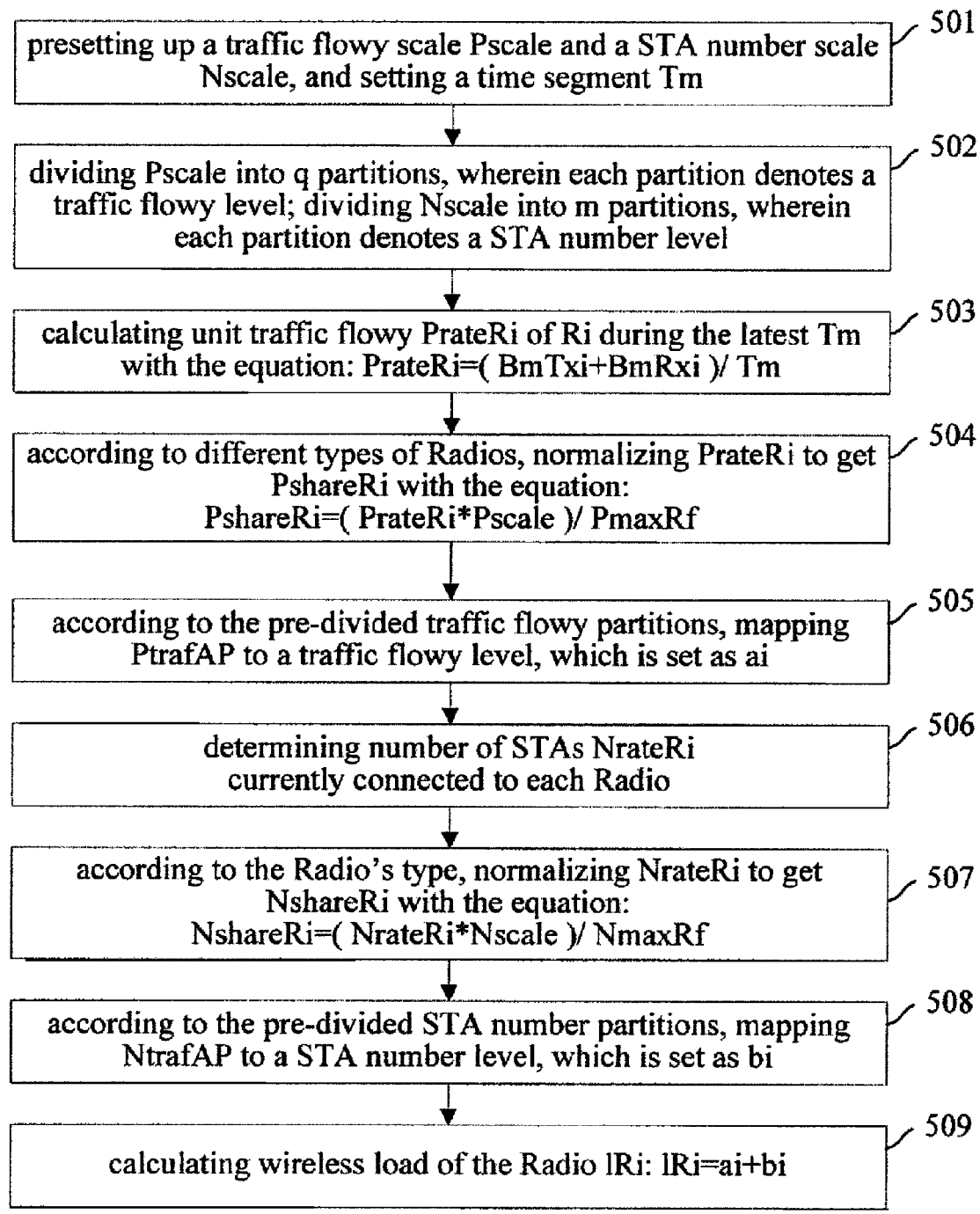
FIG. 5 is a flowchart illustrating a procedure of calculating Radio load provided by an embodiment of the present invention.

FIG. 5 is a flowchart illustrating a procedure of calculating Radio load. As shown in FIG. 5, the specific steps of the procedure are as follows.

Step 501: presetting up a traffic flow scale Pscale and a STA number scale Nscale, and setting a time segment Tm.

Step 502: dividing Pscale into q partitions, wherein each partition denotes a traffic flow level; dividing Nscale into m partitions, wherein each partition denotes a STA number level.

Step 503: calculating unit traffic flow PrateRi of Ri during the latest Tm with the equation: PrateRi=(BmTxi+BmRxi)/Tm.

Here, Ri is the ith Radio, BmTxi is the traffic flow transmitted through Ri during Tm, and BmRxi is the traffic flow received by Ri during Tm.

Step 504: according to different types of Radios, normalizing unit traffic flow PrateRi of each Radio to get PshareRi with the equation: PshareRi=(PrateRi*Pscale)/PmaxRf.

Here, f is the Radio's type valuing either a or b or g, and PmaxRF is the maximum rate supported by the Radio of type f.

Step 505: according to the pre-divided traffic flow partitions, mapping PtrafAP to a traffic flow level, which is set as ai.

Step 506: determining number of STAs NrateRi currently connected to each Radio.

Step 507: according to the Radio's type, normalizing NrateRi to get NshareRi with the equation: NshareRi=(NrateRi*Nscale)/NmaxRf Here, f is the Radio's type valuing either a or b or g, and NmaxRf is the maximum number of STAs that can be associated to the Radio of type f at the same time.

Step 508: according to the pre-divided STA number partitions, mapping NtrafAP to a STA number level, which is set as bi.

Step 509: calculating wireless load of the Radio 1Ri: 1Ri=ai+bi.

To be illustrated, as for embodiments shown in FIGS. 4 and 5, in practical application, it's not necessarily needed to normalize PrateRi and NrateRi, which may be the instance of Pscale=1 and Nscale=1 in embodiments of FIGS. 4 and 5.

As far as most vendors are concerned, after receiving an association response carrying an association rejected indicator returned by the AC, the STA will try to connect other APs that can provide the same service, which can not only increase the possibility of association acceptance, but also is in favor of implementing load balance. However, for certain vendors, even if the STA is rejected by the AC, the STA will still try to join an AP unless the STA finds another AP with stronger RSSI, which confines the AP from reaching load balance. In order to solve this problem, in step 315 shown in FIG. 3, while rejecting the STA's association request, the AC instructs the AP to hold itself from responding to probe requests of any STA, so that the STA may regard this AP as unavailable by mistake, and thus tries to connect other APs.

To support the AC to mask the probe response from AP to stations, the CAPWAP protocol has to be extended with the following vendor specific load balance indicator TLV, which is shown in Table 2 as follows.

TABLE 2

Extended load balance indicator TLV

```
Load Balance Indicator TLV
 0                   1                   2                   3
 0 1 2 3 4 5 6 7 0 1 2 3 4 5 6 7 0 1 2 3 4 5 6 7 0 1 2 3 4 5 6 7
+-+-+-+-+-+-+-+-+-+-+-+-+-+-+-+-+-+-+-+-+-+-+-+-+-+-+-+-+-+-+-+-+
|                         Vendor Identifier                     |
+-+-+-+-+-+-+-+-+-+-+-+-+-+-+-+-+-+-+-+-+-+-+-+-+-+-+-+-+-+-+-+-+
|         Element ID            |         Radio MAC Add         |
+-+-+-+-+-+-+-+-+-+-+-+-+-+-+-+-+-+-+-+-+-+-+-+-+-+-+-+-+-+-+-+-+
|                         Radio MAC Add                         |
+-+-+-+-+-+-+-+-+-+-+-+-+-+-+-+-+-+-+-+-+-+-+-+-+-+-+-+-+-+-+-+-+
| LB indicator |  Probe mask    |
```

Here, Vendor Identifier is identity of vendor occupying 4 bytes; Element ID is TLV category identity occupying 2 bytes; Radio MAC Add is MAC address of the Radio to which this TLV is sent to, occupying 6 bytes. LB indicator is load balance indicator used for indicating whether the radio needs load balance, for instance: LB indicator being "1" indicates the AP to periodically detect STAs at this Radio and to report the STA information gained during each period to the AC, while LB indicator being "0" indicates the AP not to detect STAs at this Radio, nor to report the STA information of this Radio to the AC. Probe Mask is probe hide mark, which is used for indicating the AP whether to stop responding to the STA's probe requests transmitted through this Radio. For example, if Probe Mask is "1", the AP will not respond to the STA's probe requests transmitted through this Radio anymore, namely, the AP will not return probe responses to the STA.

As to those APs that have been notified to reject responding to the STA's probe requests, the AC can periodically detect wireless loads of those APs. If it is detected that wireless load of an AP among those APs has reached the preset acceptable value, the AC sends a load balance indicator TLV to the AP, wherein Probe Mask is set as "0", in order to instruct the AP to resume responding to the STA's probe requests.

Although the AP will not respond to the STA's probe requests transmitted through this Radio after the AC notifies the Radio of the AP not to respond to any probe request of the STA, the AP can still send beacon messages to the STA through this Radio. In this way, if only one AP can provide the service required by the STA, even though the AP does not respond to the STA's prove requests, the STA gets to know from the beacon messages sent by the AP that this AP is still available, and thus the STA may continue to send association requests to this AP. When the number of association requests reaches a preset maximum number of times for requesting association Rmax, this association request becomes acceptable. In this way, service rejection attack on the STA is avoided when only one AP can provide the service requested by this STA.

In order to save TLVs, in an embodiment of the present invention, LB indicator and Probe mask can be placed in the same TLV. In practical application, LB indicator and Probe mask can also be placed in different TLVs, respectively. When the AC finds out that load balance strategy of a certain AP's certain Radio is adjusted, for example, changing from load balance needed to load balance unneeded, or changing from load balance unneeded to load balance needed, the AC can set LB indicator in the TLV and send this TLV to the AP.

Figure 6:
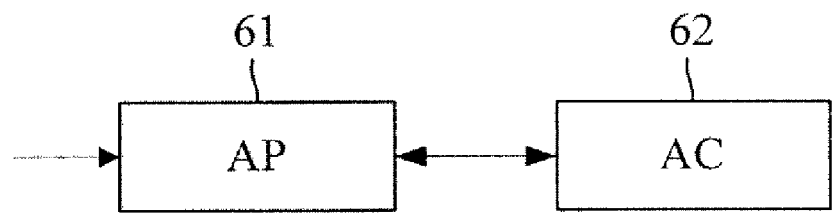
FIG. 6 is a diagram illustrating the system structure for implementing load balance in the WLAN provided by an embodiment of the present invention.

FIG. 6 is a diagram illustrating the system structure for implementing load balance provided by an embodiment of the present invention. As shown in FIG. 6, the system mainly includes AP 61 and AC 62.

The AP 61 is adapted to periodically detect STAs at its Radios, and report the acquired STA information at each Radio to the AC 62 at the end of each detection period, respectively.

The AC 62 is adapted to receive an association request of joining an AP sent by the STA, calculate wireless load of the AP that the STA requests to join, determine whether this wireless load exceeds the preset maximum load, if positive, directly reject the STA's association request; otherwise, calculate wireless load of each of the other APs that can detect this STA, if differences between wireless load of the AP that the STA requests to join and that of each of the other APs that can detect this STA, respectively, are all smaller than the preset value, accept the STA's association request; otherwise, reject the STA's association request.

Figure 7:
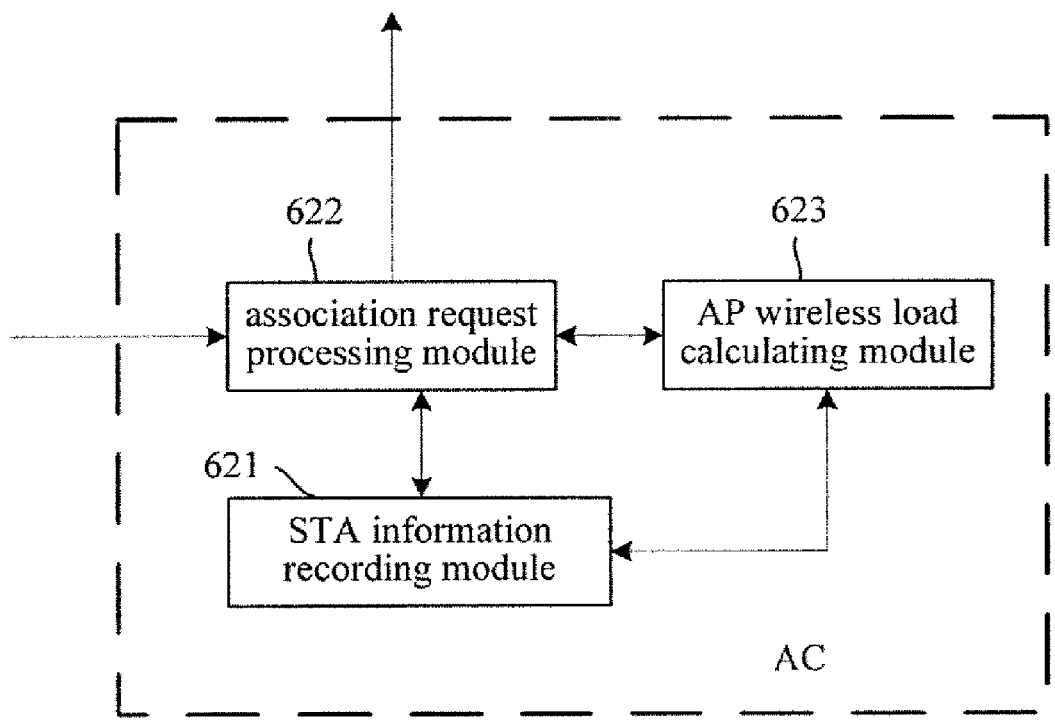
FIG. 7 is a schematic illustrating the architecture of an AC provided by an embodiment of the present invention.

FIG. 7 is a schematic illustrating the architecture of an AC provided by an embodiment of the present invention. As shown in FIG. 7, the AC mainly includes: an STA information recording module 621, an association request processing module 622 and an AP wireless load calculating module 623.

The STA information recording module 621 is adapted to record corresponding relations between information of AP and STA information.

The association request processing module 622 is adapted to receive STA information reported by an AP, and record the corresponding relations between information of AP and the STA information in the STA information recording module 621. Further, the association request processing module 622 is adapted to receive an association request from an STA for joining an AP, send the information of the AP that the STA requests to join to the AP wireless load calculating module 623, receive wireless load of the AP that the STA requests to join from the AP wireless load calculating module 623, determine whether the received wireless load exceeds the preset maximum load, if yes, directly reject the STA's association request; and otherwise, acquire information of other APs that can detect this STA from the STA information recording module 621, send the information of other APs that can detect this STA to the AP wireless load calculating module 623, receive wireless loads of the other APs that can detect this STA from the AP wireless load calculating module 623, and if differences between the wireless load of the AP that the STA requests to join and that of each of the other APs that can detect this STA are all lower than the preset value, accept this STA's association request; otherwise, reject this STA's association request.

The AP wireless load calculating module 623 is adapted to receive the information of the AP sent by the association request processing module 622, calculate wireless load of the AP, and send the wireless load of the AP to the association request processing module 622.

Figure 8:
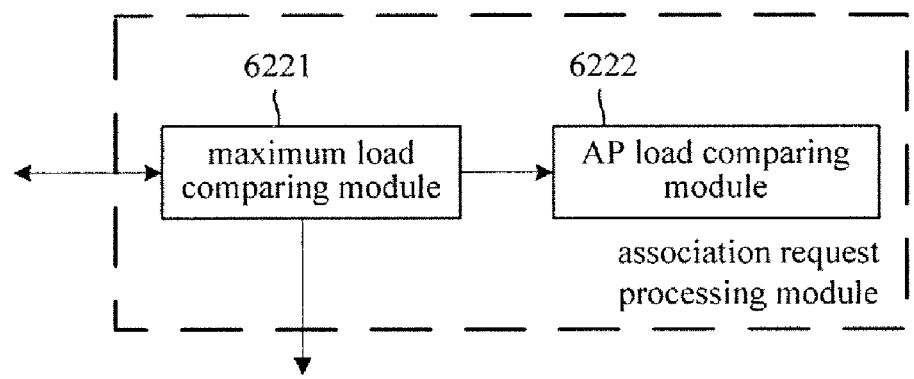
FIG. 8 is a diagram illustrating the structure of an association request processing module provided by an embodiment of the present invention.

As shown in FIG. 8, the association request processing module 622 includes: a maximum load comparing module 6221 and an AP load comparing module 6222.

The maximum load comparing module 6221 is adapted to receive the STA's association request of joining an AP, send information of the AP that the STA requests to join to the AP wireless load calculating module 623, receive from the AP wireless load calculating module 623 wireless load of the AP that the STA requests to join, determine whether the wireless load exceeds the preset maximum load, if yes, directly reject the STA's association request; otherwise, acquire from the STA information recording module 621 information of other APs that can detect the STA, send the information of other APs that can detect the STA to the AP wireless load calculating module 623, receive from the AP wireless load calculating module 623 wireless loads of the other APs that can detect the STA, send the information of other APs that can detect this STA to the AP wireless load calculating module 623, and send the wireless load of the AP that the STA requests to join, together with the wireless loads of other APs that can detect the STA returned by the AP wireless load calculating module 623, to the AP load comparing module 6222.

The AP load comparing module 6222 is adapted to determine whether differences between the wireless load of the AP that the STA requests to join, which is sent by the maximum load comparing module 6221, and the wireless load of each of the other APs that can detect this STA, which is returned by the wireless load calculating module 623, respectively, are all lower than the preset value, if yes, accept the STA's association request; otherwise, reject the STA's association request.

Figure 9:
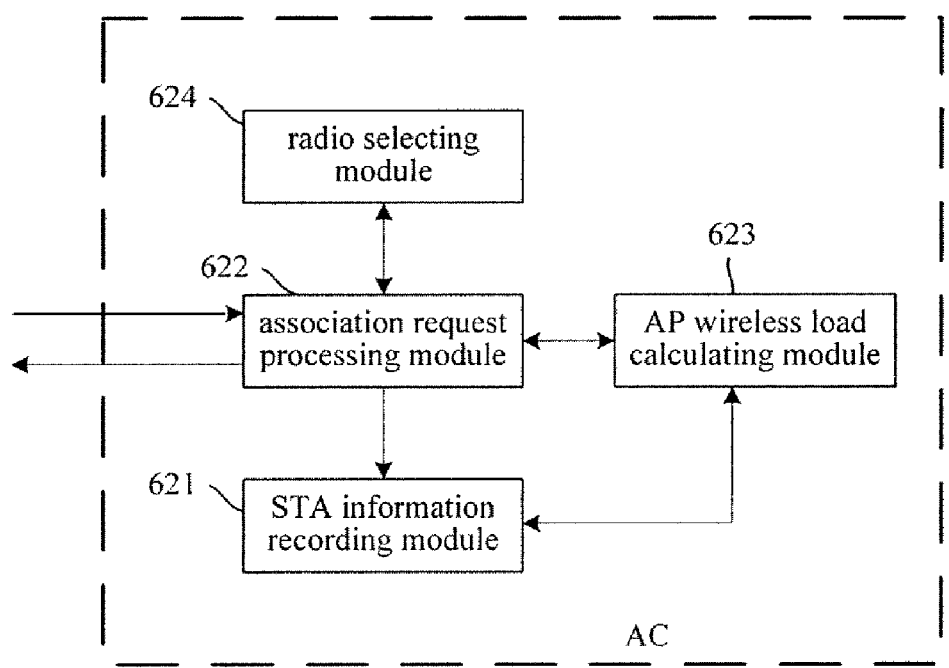
FIG. 9 is a schematic illustrating the architecture of an AC provided by another embodiment of the present invention.

As shown in FIG. 9, the AC further includes: a radio selecting module 624, which is adapted to, when receiving an association accepted indicator sent by the association request processing module 622, figure out loads of radios of the AP that the STA requests to join, and send the identifier of the radio with the least load to the association request processing module 622.

Accordingly, the association request processing module 622 is adapted to send, after accepting the STA's association request, the association accepted indicator carrying information of the AP the STA requests to join to the radio selecting module 624, receive the identifier of the radio sent by the radio selecting module 624, and notify the STA to join the AP through this radio.

Figure 10:
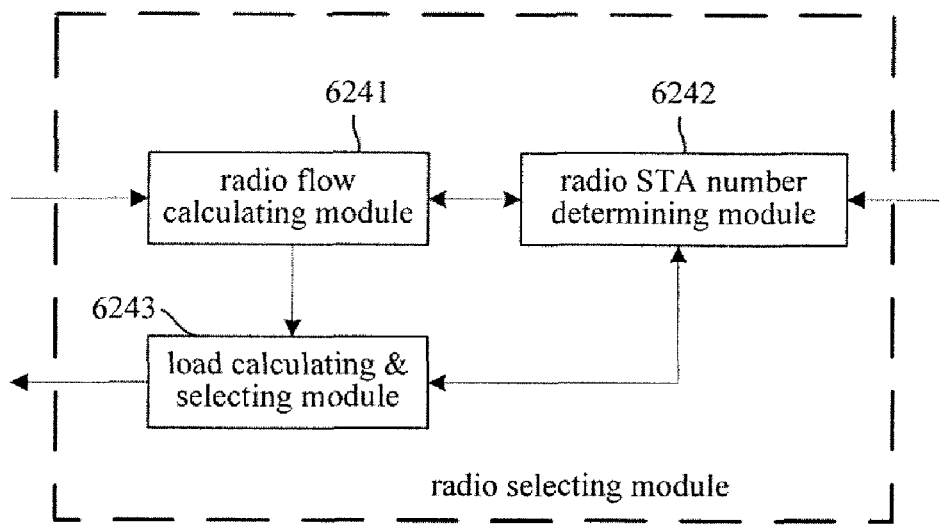
FIG. 10 is a diagram illustrating the structure of a Radio selecting module provided by an embodiment of the present invention.

As shown in FIG. 10, the radio selecting module 624 includes: a radio flow calculating module 6241, a radio STA number determining module 6242 as well as a load calculating & selecting module 6243.

The radio flow calculating module 6241 is adapted to figure out, after receiving the association accepted indicator sent by the association request processing module 622, unit traffic flow of each radio of the AP that the STA requests to join, normalize the unit traffic flow of each radio according to type of the radio, and transmit the normalized unit traffic flow of each radio of the AP to the load calculating & selecting module 6243.

The radio STA number determining module 6242 is adapted to normalize, after receiving the association accepted indicator sent by the association request processing module 622, number of STAs currently connected to each radio according to type of each radio of the AP that the STA requests to join, and transmit the normalized number of STAs currently connected to the load calculating & selecting module 6243.

The load calculating & selecting module 6243 is adapted to determine load of each radio according to the normalized unit traffic flow of each radio of the AP that the STA requests to join, which is sent by the radio flow calculating module 6241, as well as the normalized number of STAs current connected, which is sent by the radio STA number determining module 6242, and send identifier of the radio with the least load to the association request processing module 622.

Figure 11:
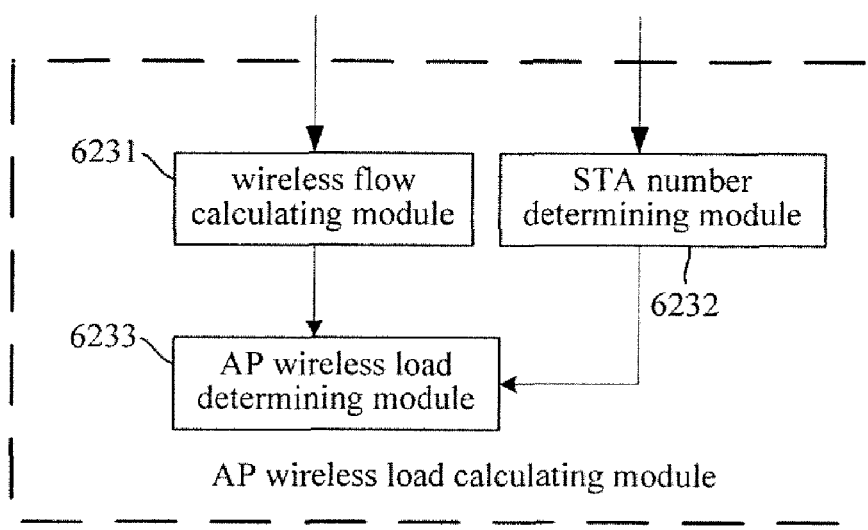
FIG. 11 is a diagram illustrating the structure of an AP wireless load calculating module provided by an embodiment of the present invention.

As shown in FIG. 11, the AP wireless load calculating module 623 includes: a wireless flow calculating module 6231, an STA number determining module 6232 and an AP wireless load determining module 6233.

The wireless flow calculating module 6231 is adapted to receive information of AP sent by the association request processing module 622, determine unit traffic flow of each radio of the AP corresponding to information of AP, normalize unit traffic flow of the radios according to radio types, and send the normalized unit traffic flow of each radio of the AP to the AP wireless load determining module 6233.

The STA number determining module 6232 is adapted to receive information of AP sent by the association request processing module 622, according to type of each radio of the AP corresponding to the information of AP, normalize number of STAs currently connected to each radio, and send the normalized number of STAs currently connected to each radio of the AP to the AP wireless load determining module 6233.

The AP wireless load determining module 6233 is adapted to determine wireless load of each AP according to the normalized unit traffic flow of each radio of the AP, which is sent by the wireless flow calculating module 6231, as well as the normalized number of STAs currently connected to each radio of the AP, which is sent by the STA number determining module 6232.

In practical application, the association request processing module 622 is adapted to determine, after receiving the association request sent by the STA for joining an AP, number of times the STA has requested for association, add 1 to the number of times and determine whether it exceeds the preset maximum times for requesting association, if yes, directly accept the STA's association request; otherwise, perform the process of sending out the STA information, and update the recorded number of times the STA has requested for association. Accordingly, the AC 62 further includes an association times recording module adapted to record number of times each STA has requested for association.

In practical application, the AC may also include a module of notifying to reject responding to probe, which is adapted to, after receiving a probe rejected indicator that carries information of AP sent by the association request processing module 622, notify this AP not to respond to probe requests sent by the STA anymore. Accordingly, after rejecting the STA's association request, the association request processing module 622 sends the probe rejected indicator carrying information of the AP that the STA requests to join to the module of notifying to reject responding to probe.

The AC may also include: a probe resuming module, adapted to record information of APs that will not respond to the STA's probe request, periodically examine the recorded wireless load of each AP, and notify an AP to resume responding to the STA's probe request when detecting that an AP's wireless load has decreased and satisfies the preset acceptable value. Accordingly, after the STA's association request is rejected, the association request processing module 622 records identity of the AP that the STA requests to join into the probe resuming module.

The AC may also include: a load balance strategy adjusting module, adapted to notify an AP not to detect STAs at a radio anymore after deciding not to perform load balance at the radio of the AP; and/or, adapted to notify an AP to detect STAs at a radio after deciding to perform load balance at the radio of the AP, and report the detected STAs to the AC.

An application that applies embodiments of the present invention for load balance is given as follows.

Figure 12:
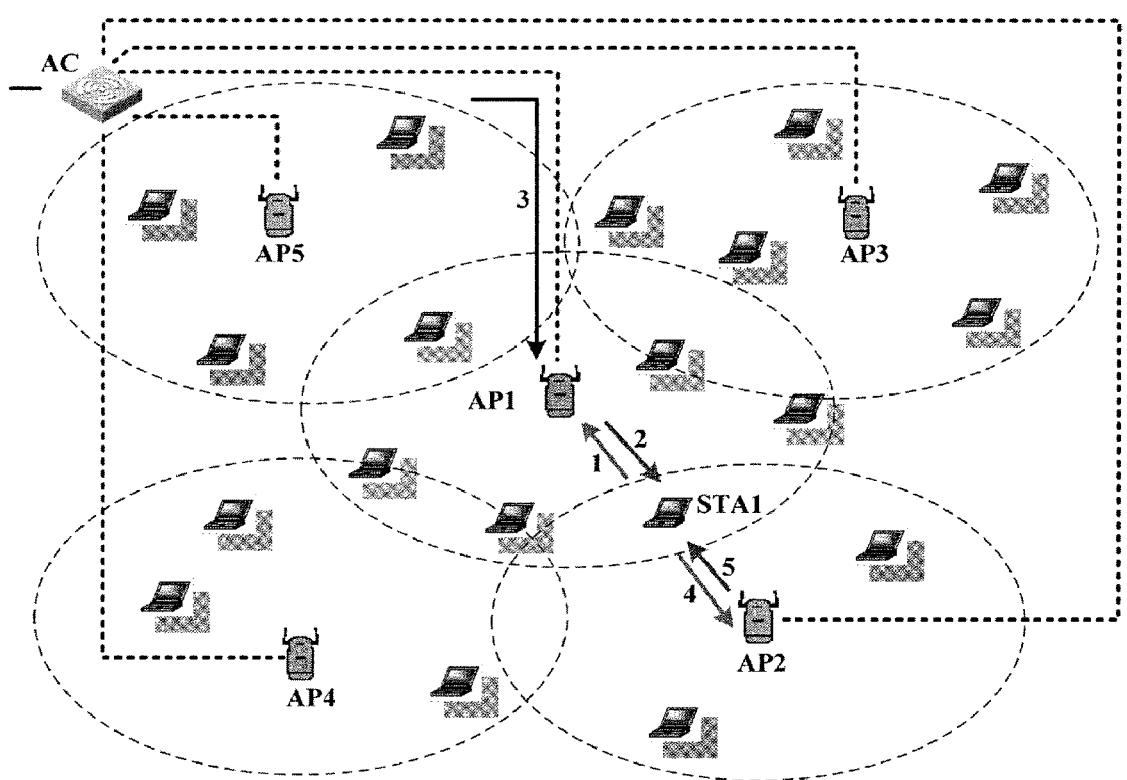
FIG. 12 is a schematic illustrating the application of an embodiment of the present invention.

As shown in FIG. 12, AP1 is associated with 5 STAs, AP2 with 3, AP3 with 5, AP4 with 3, and AP5 with 3 STAs.

STA1 is visible to AP1 and AP2. When STA1 observes that AP1 has a higher RSSI, it initiates a request to the AC for joining AP1 (signalling 1). The AC realizes that both AP1 and AP2 can service STA1, and the AC finds that AP1 is already handling 5 STAs and AP2 is just handling two STAs. Hence, the AC rejects the STA's request of joining AP1 through the association response (signalling 2) with status code 17. Meanwhile, the AC sends a configuration update request message (signalling 3) to the AP through the CAPWAP control tunnel, and the Probe mask of TLV in this message is set as 1, in order to indicate AP1 to reject responding to the STA's probe request. Although receiving the association response with reason code 17, the STA may continue requesting to join AP1. The STA may initiate a request to the AC for joining AP2 (signalling 4) once failing to receive any association response from AP1, wherein AP2 is of next best signal that the STA can detect, and then the AC will compare AP2's current load with the preset maximum load. Since the AP2's current load is less than both the preset maximum load and the AP1's load, the AC will send to the STA an association response carrying an association accepted indicator (signalling 5).

It is testified by experiment that, by applying the wireless load balance scheme provided by embodiments of the present invention, the system performance of the WLAN can be increased by 38%.

The wireless load balance scheme provided by embodiments of the present invention may be applied in enterprise wireless resolution.

The above illustrations are just preferable embodiments of the present invention and not used to confine the present invention. Any modification, equivalent substitute and improvement within spirit of the present invention are within the protection scope of the present invention.

The invention claimed is:

1. A method of balancing wireless load, comprising:
   receiving by an Access Controller (AC) an association request of joining an Access Port (AP) sent by a Station (STA);
   calculating wireless load of the AP that the STA requests to join;
   determining whether one or more preset conditions are met, if the one or more present conditions are met, accepting the association request sent by the STA; otherwise, rejecting the association request sent by the STA; and reporting by the AP detected STA information to the AC, wherein determining whether one or more preset conditions are met comprises, calculating wireless loads of other APs that can detect the STA, determining whether differences between the wireless load of the AP that the STA requests to join and the wireless load of each of the other APs that can detect the STA are all smaller than a preset value, if the differences are all smaller than a present value, accepting the association request sent by the STA, otherwise, rejecting the association request sent by the STA, determining whether the wireless load of the AP that the STA requests to join exceeds a preset maximum load, if the wireless load exceeds the preset maximum load, directly rejecting the association request sent by the STA, and if the wireless load does not exceed the preset maximum load,
   accepting the association request sent by the STA, or
   forwarding to the process of calculating wireless loads of other APs and determine whether differences between the wireless load of the AP that the STA requests to join and the wireless load of each of the other APs are all smaller than a preset value.

2. The method according to claim 1, further comprising:
after the association request sent by the STA is accepted, selecting a radio with the least load by the AC from radios of the AP that the STA requests to join, and designating that the STA will join the AP through the radio with the least load.

3. The method according to claim 1, wherein the process of calculating wireless load of the AP that the STA requests to join comprises:
   calculating unit traffic flow of each radio of the AP, and summing up the unit traffic flow of all the radios as wireless traffic flow of the AP;
   figuring out number of STAs currently connected to each radio of the AP, summing up numbers of STAs currently connected to all the radios and taking the sum as number of STAs currently connected to the AP; and
   obtaining wireless load of the AP according to the wireless traffic flow of the AP and the number of STAs currently connected to the AP.

4. The method according to claim 3, wherein
the process of calculating unit traffic flow of each radio of the AP comprises:
calculating sum of traffic flow transmitted and received on each radio per unit time, dividing the sum by the maximum rate supported on the radio to obtain a quotient, and taking the obtained quotient as unit traffic flow of the radio; and
the process of figuring out number of STAs currently connected to each radio comprises
dividing number of STAs currently connected to each radio by the maximum number of STAs that can be connected to the radio at the same time to obtain a quotient, and taking the obtained quotient as number of STAs currently connected to the radio.

5. The method according to claim 3, further comprising:
dividing normalized maximum traffic flow within the AP's ability into a first predetermined number of traffic flow partitions, and setting up traffic flow levels from low to high for the traffic flow partitions with traffic flow from small to large;

dividing normalized maximum number of STAs that can join the AP at the same time into a second predetermined number of STA number partitions, and setting up STA number levels from low to high for the STA number partitions with numbers of STAs from small to large; and the process of obtaining wireless load of the AP according to the wireless traffic flow of the AP and the number of STAs currently connected to the AP comprising
mapping the wireless traffic flow of the AP into a preset traffic flow level, mapping the number of STAs currently connected to the AP into a preset STA number level, and summing up the mapped traffic flow level and STA number level to get the wireless load of the AP.

6. The method according to claim 2, wherein the process of selecting a radio with the least load by the AC from the AP after the association request sent by the STA is accepted comprises:
the AC calculating unit traffic flow of each radio at the AP, determining number of STAs currently connected to each radio, and obtaining load of each radio according to the unit traffic flow and the number of STAs.

7. The method according to claim 1, wherein the process of receiving by the AC an association request of joining the AP sent by the STA further comprises:
recording by the AC number of times the STA has already requested for association; and
determining whether the number of times has reached a preset maximum times, if the preset maximum times has been reached, directly accepting the STA's association request; otherwise, calculating wireless load of the AP that the STA requests to join.

8. The method according to claim 1, wherein the process of rejecting by the AC the association request sent by the STA further comprises:
the AC notifying the STA that the requested AP will not respond to the STA's probe request anymore.

9. The method according to claim 8, further comprising:
the AC periodically detecting wireless load of the AP that will not respond to the STA's probe request, notifying the AP to resume responding to the STA's probe request when finding that the wireless load of the AP has reduced to a preset acceptable value.

10. An Access Controller (AC), comprising:
an association request processing module, capable of receiving an association request of joining an Access Port (AP) sent by an STA, sending out information of the AP that the STA requests to join, receiving wireless load of the AP that the STA requests to join, and if the wireless load meets the preset acceptance condition, accepting the STA's association request, otherwise, rejecting the STA's association request;
an AP wireless load calculating module, capable of receiving the information of the AP sent by the association request processing module, calculating wireless load of the AP, and sending the wireless load of the AP to the association request processing module;
an STA information recording module, capable of recording corresponding relations between information of AP and STA information,
wherein the association request processing module comprises,
a first submodule and a second submodule, where the first submodule is for
- receiving the association request of joining an AP sent by the STA,
- sending out information of the AP that the STA requests to join,
- receiving wireless load of the AP that the STA requests to join from the AP wireless load calculating module,
- acquiring from the STA information recording module information of other APs that can detect the STA,
- sending the information of other APs that can detect the STA to the AP wireless load calculating module, and
- sending wireless load of the AP that the STA requests to join, together with wireless loads of other APs that can detect the STA returned by the AP wireless load calculating module, to the second submodule, and where the second submodule is for
- determining whether differences between wireless load of the AP that the STA requests to join, which is sent by the first submodule, and wireless load of each of the other APs that can detect the STA, which is returned by the wireless load calculating module, respectively, are all lower than a preset value, and
- if the differences are all lower than a preset value, accepting the STA's association request, otherwise, rejecting the STA's association request.

11. The AC according to claim 10, wherein the first submodule is further capable of determining whether the wireless load exceeds the preset maximum load, and directly rejecting the STA's association request if the wireless load exceeds the preset maximum load.

12. The AC according to claim 10, further comprising: a radio selecting module, capable of figuring out loads of radios of the AP that the STA requests to join when receiving an association accepted indicator sent by the association request processing module, and sending identifier of the radio with the least load to the association request processing module; and
the association request processing module is further capable of sending the association accepted indicator carrying information of the AP that the STA requests to join to the radio selecting module after accepting the STA's association request, receiving the identifier of the radio sent by the radio selecting module, and notifying the STA to join the AP through the radio.

13. The AC according to claim 12, wherein the radio selecting module comprises:
- a radio flow calculating module, capable of figuring out unit traffic flow of each radio of the AP that the STA requests to join after receiving the association accepted indicator sent by the association request processing module, normalizing the unit traffic flow of each radio according to type of the radio, and transmitting the normalized unit traffic flow of each radio of the AP to a load calculating & selecting module;
- a radio STA number determining module, capable of normalizing number of STAs currently connected to each radio according to type of each radio of the AP that the STA requests to join after receiving the association accepted indicator sent by the association request processing module, and sending out the normalized number of STAs current connected to each radio of the AP; and
- the load calculating & selecting module, capable of determining load of each radio according to the normalized unit traffic flow of each radio of the AP that the STA requests to join, which is sent by the radio flow calculating module, as well as the normalized number of STAs current connected, which is sent by the radio STA number determining module, and sending identifier of the radio with the least load to the association request processing module.

14. The AC according to claim 10, wherein the AP wireless load calculating module comprises:
- a wireless flow calculating module, capable of calculating unit traffic flow of each radio of the AP, normalizing the unit traffic flow of each radio according to type of the radio, and sending out the normalized unit traffic flow of each radio of the AP;
- an STA number determining module, capable of normalizing number of STAs currently connected to each radio according to type of each radio of the AP, and sending out the normalized number of STAs currently connected to each radio of the AP; and
- an AP wireless load determining module, capable of determining wireless load of the AP according to the normalized unit traffic flow of each radio of the AP, which is sent by the wireless flow calculating module, as well as the normalized number of STAs currently connected to each radio of the AP, which is sent by the STA number determining module.

15. The AC according to claim 10, wherein the association request processing module is capable of determining number of times the STA has requested for association after receiving the association request of joining an AP sent by the STA, adding 1 to the number of times and determining whether it exceeds the preset maximum times of association request, if the number of times exceeds the preset maximum times, directly accepting STA's association request; otherwise, performing the process of sending out STA information, and updating the recorded time of the STA's association requests; and
the AC further comprises: an association times recording module, capable of recording number of times each STA has requested for association.

16. The AC according to claim 10, further comprising: a module of notifying to reject responding to probe, capable of notifying an AP not to respond to a probe request sent by the STA anymore after receiving a probe rejected indicator that carries information of the AP sent by the association request processing module; and
the association request processing module is further capable of sending the probe rejected indicator carrying information of the AP that the STA requests to join to the module of notifying to reject responding to probe after the STA's association request is rejected.

17. The AC according to claim 16, further comprising: a probe resuming module, capable of recording information of APs that will not respond to the STA's probe request, periodically examining the recorded wireless load of each AP, and notifying an AP to resume responding to the STA's probe request when detecting that the AP's wireless load has decreased below the preset acceptable value; and
the association request processing module is further capable of recording identity of the AP that the STA requests to join into the probe resuming module after the STA's association request is rejected.

* * * * *